Jan. 19, 1937.    P. DUFFING ET AL    2,068,402
MOTOR OPERATED MECHANISM FOR CIRCUIT BREAKERS
Filed May 25, 1932
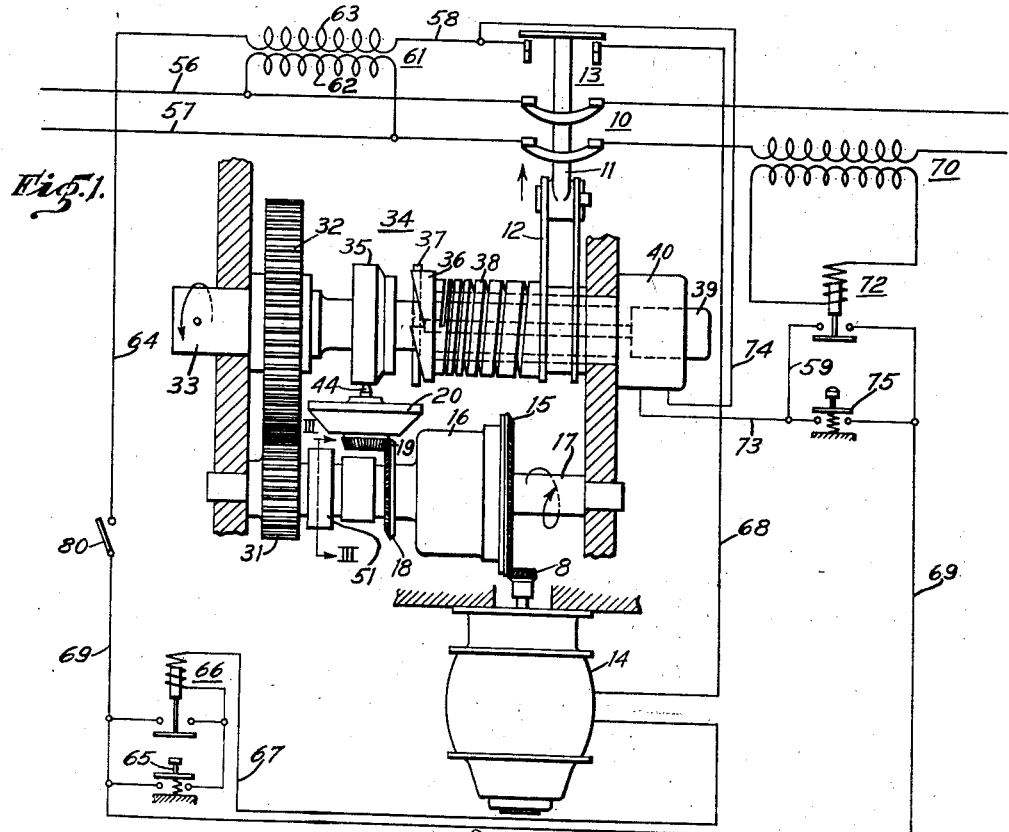
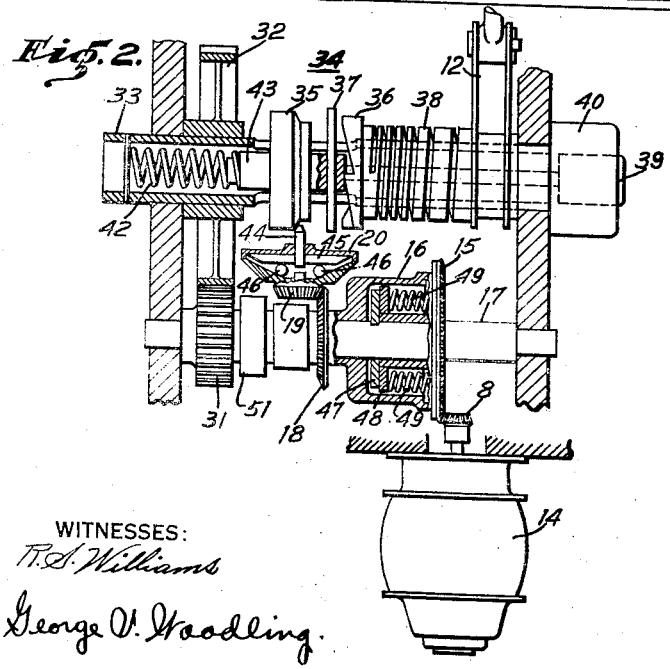
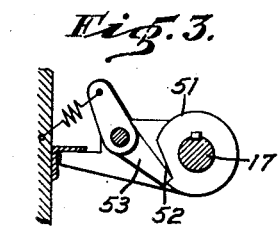
WITNESSES:
R. A. Williams
George V. Woodling.
INVENTOR
Paul Duffing and
Walter Hergert
BY
W. R. Coley
ATTORNEY Patented Jan. 19, 1937

2,068,402

UNITED STATES PATENT OFFICE 2,068,402

MOTOR-OPERATED MECHANISM FOR CIRCUIT BREAKERS

Paul Duffing, Berlin-Siemensstadt, and Walter Hergert, Berlin-Conradshohe, Germany, assignors to Westinghouse Electric & Manufacturing Company, East Pittsburgh, Pa., a corporation of Pennsylvania Application May 25, 1932, Serial No. 613,456
In Germany June 4, 1931

13 Claims. (Cl. 200—92)

Our invention relates, in general, to circuit breakers and more particularly to motor-operated mechanism for circuit breakers.

An object of our invention is the provision of a mechanism of the class indicated that shall be simple and reliable in operation and be readily manufactured and installed.

A more specific object of our invention is the provision of a disengageable coupling in combination with a band friction clutch, mounted between the motor and the circuit breaker whereby the breaker may be easily tripped with the application of a small amount of force.

It is also an object of our invention to provide for tripping the breaker in the event that an overload condition occurs on the power lines.

Another object of our invention is to prevent, in the event of an overload condition, the reclosing of the circuit breaker or a "pumping action", should the motor continue to run after the breaker has been tripped by the overload condition.

A further object of our invention is to utilize a disengageable coupling of the claw type, whereby the number of claws of the coupling and the total angle of motion covered by both the main shaft of the circuit breaker and the winding or unwinding of the band friction clutch, are so chosen that the number of claws times the total angle of motion equals 360°.

Other objects and a fuller understanding of our invention may be had by referring to the following description, taken in connection with the accompanying drawing, in which;

Figure 1 is a diagrammatic view of a motor-operated mechanism for circuit breakers embodying the features of our invention, the said mechanism being shown in closed-circuit position of the circuit breaker.

Fig. 2 is a fragmentary view, partly in section, of the motor-operated mechanism that is shown in Fig. 1, the said mechanism being shown in the open circuit position of the circuit breaker.

Fig. 3 is a view taken along the line III—III of Fig. 1, and illustrates a latching means for securing the circuit breaker in the closed-circuit position after the motor has operated to close the contacts of the circuit breaker.

With reference to the drawing, our invention comprises, in general, a circuit breaker 10, a motor 14 for closing the circuit breaker 10, a disk-type friction clutch 16 mounted upon an auxiliary shaft 17, gear wheels 31 and 32 for rotating the main breaker shaft 33, a disengageable coupling 34, a band friction clutch 38, a tripping plunger 39, and electrical circuits for controlling the motor-operated mechanism.

The driving motor 14 may be mounted upon a flange or bracket on the base and is disposed to drive the friction clutch 16 by means of the bevel gears 8 and 15. As shown in section in Fig. 2, the housing and the bevel gear 15 are rotatably mounted upon the auxiliary shaft 17. Suitably keyed, or otherwise connected, to the auxiliary shaft 17 is a disc 47 that is frictionally driven by an engaging ring 48, which is yieldingly pressed against the disk 47 by means of coil springs 49. The object of the friction clutch 16 is to enable the motor 14 to rotate after the circuit breaker 10 is actuated to its full closed-circuit position. This provision protects the motor 14 against overloads. As is manifest, the point at which the friction clutch 16 begins to slip may be varied by choosing springs 49 of different strength.

The gear wheel 31 is rigidly connected by means of a suitable key or otherwise to the auxiliary shaft 17 and engages the gear wheel 32 which is rigidly connected to the main breaker shaft 33. For reasons which will be pointed out later, the gear wheel 32, in the illustrated embodiment, is four times as large as the gear wheel 31. As illustrated in the cross sectional view of Fig. 2, the main breaker shaft 33 is hollow. On the right end of the main breaker shaft 33 two spaced arms 12 for actuating the circuit breaker 10 are carried, but not connected thereto. The means for connecting the two spaced arms 12 to the main breaker shaft 33 comprise the combination of a disengageable coupling 34 and a band friction clutch 38.

The disengageable coupling 34 is of the claw or notched type, and includes a collar 36 having diametrically opposite notches formed on one face thereof and a pin 37 for engaging the said notches of the collar 36. The notched collar 36 is not connected to the main breaker shaft 33. As illustrated in Fig. 2, that part of the main breaker shaft 33 about which the disengageable coupling 34 is mounted, is slitted in an axial direction so that the engaging pin 37 may be moved axially with respect to the main breaker shaft 33. Mounted within the hollow portion of the main breaker shaft 33 and connected to the engaging pin 37 is a movable block 43 which is normally biased by means of the coil spring 42 to the right. This means that the engaging pin 37 is normally constrained to engage the diametrically opposite notches provided in the collar 36. A tripping plunger 39 is connected to the right end of the movable block 43, so that when the tripping plunger 39 is actuated to the left either by manually depressing the tripping plunger 39 or by energizing the electromagnet 40, the engaging pin 37 may be disengaged from the notches of the collar 36.

The band friction clutch 38 closely surrounds the main breaker shaft 33 and interconnects the notched collar 36 at its low torque end with the actuating arms 12 at its high torque end. The band friction clutch 38 may be constructed by cutting a helical slit in a piece of pipe, so that after the pipe is slitted it constitutes a flexible spring band. Just as soon as the main breaker shaft 33 begins to rotate, the band friction clutch 38 begins to rotate at the low torque end in the direction indicated by the arrow, and will, after a few degrees of rotation, be tightly wrapped around the main breaker shaft 33, thus forming a rigid connection between the main breaker shaft 33 and the actuating lever 12.

As is obvious, by means of the band friction clutch 38, the torque that the engaging pin 37 is transmitting to the notched collar 36 at the low torque end is very small compared to the total amount of torque transmitted by the entire band friction clutch 38 to the main breaker shaft 33 at the high torque end for the reason that the torque is greatly reduced exponentially with the angle of embracement of the band friction clutch 38. Consequently, the force required to trip the breaker, that is, to disengage the pin 37 from the notched collar 36, is very small.

Associated with the disengageable coupling 34 and axially mounted upon the main breaker shaft 33, is a disk 35 which is connected to the movable block 43 (see Fig. 2). The right hand part of the disk 35 is turned off, so that the disk has a step-shaped profile. Positioned directly below the disk 35 is a governor 20 driven by the housing of the slip friction clutch 16 by means of bevel gears 18 and 19. As shown in Fig. 2, the governor 20 comprises, in general, a locking pin 44 supported by a disc 45 which is moved up-and-down by the centrifugal action of balls 46. Therefore, should the motor 14 continue to run after the breaker has been tripped, the locking pin 44, since it will be in its raised position, prevents the disk 35 from moving to the right. This means that the breaker is not allowed to reclose or to effect a "pumping action", should even the motor continue to run after the breaker is tripped.

The control circuit for effecting the operations of the motor-operated mechanism comprises, in general, a line transformer 61, a start push button 65 and an associated self energized relay 66, a current transformer 70, a tripping relay 72 that is responsive to the current induced in the secondary winding of the current transformer 70, a remote push button 75, and an auxiliary contact member 13 actuated by the main circuit breaker 10. The primary winding 62 of the line transformer 61 is connected across the main power conductors 56 and 57, and the secondary winding 63 is disposed to energize both the motor 14 when either the start push button 65 is depressed or the relay 66 is energized, and the electromagnet 40 when either the tripping relay 72 is energized by the current induced in the secondary winding of the current transformer 70 or the remote push button 75 is depressed.

In explaining the operation of the mechanism, it will be assumed that the circuit breaker 10 is in the open-circuit position. In closing the circuit breaker, it is only necessary for the operator to depress the starting push button 65, whereupon current flows from the left hand side of the secondary winding 63 of the transformer 61 through conductor 64, switch 80, conductor 69, the start push button 65, the winding of the relay 66, conductor 67, the winding of the motor 14, conductor 68, the auxiliary contact members 13, and conductor 58 to the opposite side of the secondary winding 63. Just as soon as the contacts of the relay 66 are closed, the relay is self energized, and then it is no longer necessary for the operator to depress the start push button 65. The motor 14 continues to run and rotate the auxiliary shaft 17 in the direction indicated by the arrow. The auxiliary shaft 17, in turn, transmits motion to the main breaker shaft 33 through the gear wheels 31 and 32. With the main breaker shaft 33 rotating as indicated by the arrow, the engaging pin 37 moves the collar 36 to wind the band friction clutch 38 tightly around the main breaker shaft 33, thus forming a substantially rigid driving connection between the main breaker shaft 33 and the actuating arm 12. The rotational movement of the actuating arm 12 is then transmitted to close the main breaker 10.

The motor 14 continues to run until the main breaker 10 is actuated to its full closed-circuit position at which point the auxiliary contact members 13 interrupt the circuit for the motor 14. As illustrated in Fig. 3, when the circuit breaker is actuated to the full closed-circuit position, a spring actuated latch 53 engages a complementary notch 52 provided in a collar 51 that may be suitably keyed, or otherwise connected, to the shaft 17. Hence, by means of the latching engagement, the main circuit breaker 10 is held in the full closed-circuit position after the motor 14 is deenergized.

In tripping the breaker, it is only necessary to manually or electrically shift the tripping plunger 39 to the left, whereupon the engaging pin 37 releases the notched collar 36. As hereinbefore pointed out, the amount of force required to shift the tripping plunger 39 to the left is very small for the reason that the strongly tightened band friction clutch 38 considerably reduces the tripping torque. During the tripping motion of the circuit breaker 10, the actuating arms 12, the band friction clutch 38 and the notched collar 36 are turned backwards through an angle equal to the angle through which they were actuated forwardly during the closing of the main circuit breaker 10. This means that after the tripping action is completed, the engageable pin 37 engages the next diametrically opposite pair of rear notches provided on the face of the collar 36. In order that the engageable pin 37 will directly register with the next rear pair of diametrically opposite set of notches, without requiring the driving motor 14 to make a few revolutions, the number of notches of the collar 36 and the total angle of motion covered by both the actuating arm 12 and the twisting of the band friction clutch 38 are so chosen that the number of notches times the total angle of motion equals 360°.

In the illustrated embodiment of our invention, we provide four notches about the collar 36. This, in accordance with the above outlined conditions, means that during the closing of the main circuit breaker 10, the collar 36 is advanced forwardly through an angle of 90°, and that during the tripping of the main circuit breaker 10, the collar 36 is actuated rearwardly through an angle of 90°. In this manner, lost motion between the engageable pin 37 and the notched collar 36 is totally eliminated. Hence, by making the gear wheel 32 four times as large as the gear wheel 31, the auxiliary shaft 17 makes one complete revolution while the engageable pin 37 moves through an angle of 90°. In consequence, the latch 53 and the complementary notch 52 that is provided in the collar 51 (see Fig. 3), are so matched that just as soon as the main circuit breaker 10 is actuated to the full closed-circuit position, they are in locking engagement with each other.

In the event that an overload condition occurs on the main power conductors 56 and 57, the tripping relay 72 is energized by the current induced in the secondary winding of the current transformer 70. The closure of the contacts of the tripping relay 72 completes a circuit for energizing the electromagnet 40 for tripping the circuit breakers. Under this condition, current flows from the left hand side of the secondary transformer winding 63 through conductor 64, switch 80, conductor 69, the contact members of the tripping relay 72, conductors 59 and 73, the windings of the electromagnet 40, and conductors 74 and 58 to the opposite side of the secondary transformer winding 63.

Should short circuit condition prevail upon the main power conductors 56 and 57 during the closing operations of the main circuit breaker, the governor 20 functions to prevent the reclosing of the breaker when it is tripped. Under this condition, just as soon as the contacts of the main circuit breaker are initially bridged by the flexible or resilient bridging members, a current will be induced in the secondary winding of the transformer 70 for operating the tripping relay 72, which, in turn, trips the breaker before the auxiliary contact members 13 are opened. This means that the motor 14 continues to run, and if no means are provided the breaker will again reclose producing a "pumping action". However, in this embodiment of the invention, just as soon as the tripping plunger 39 is actuated to the left, the disk 35 is likewise actuated to the left. Since the motor 14 is running the locking pin 44, under the centrifugal force of the balls 46, is thrust upwardly and engages the stepped-edge of the disk 35 (see Fig. 2). Hence, by means of the action of the locking pin 44 of the governor, in combination with the stepped-disc 35, the pin 37 is prevented from reengaging the notched collar 36. Consequently, the reclosure of the main circuit breaker 10 is prevented. Therefore, the motor will continue to run, and nothing will happen. The "pumping action" which is avoided by the employment of the governor 20 is dangerous, particularly, when it is attempted to close the circuit breaker on a short circuit. The continual closing and tripping of the breaker causes considerable quantities of gases to form in the tank of the breaker under the influence of the arc prevailing between the contact members and, if this "pumping action" continued for any length of time, it may lead to the total destruction of the breaker. The main circuit breaker 10 after it is tripped by an overload condition remains in the open-circuit position and the reclosure thereof is prevented until the operator stops the motor 14 by opening the switch 80. This causes the locking pin 44 to release the stepped-disc 35. Consequently, the pin 37 again engages the notched collar 36 and the mechanism is in readiness to reclose the breaker.

Since certain changes in our invention may be made without departing from the spirit and scope thereof, it is intended that all matters contained in the foregoing description and shown in the accompanying drawing shall be interpreted as illustrative and not in a limiting sense.

We claim as our invention:

1. A motor-operated mechanism for a circuit breaker comprising, in combination, an actuating member disposed to operate the breaker, a drive shaft, a motor for actuating the drive shaft, a disengageable coupling having two relatively movable parts, one of said parts being freely mounted upon said drive shaft and the other part being slidably mounted in an axial direction upon said drive shaft, and a band friction clutch surrounding the drive shaft and interconnecting the freely mounted part of the disengageable coupling and the actuating member.

2. A motor-operated mechanism for a circuit breaker comprising, in combination, an actuating member disposed to operate the breaker, a drive shaft, a motor for actuating the drive shaft, a disengageable coupling having two relatively movable parts, one of said parts being freely mounted upon said drive shaft and the other part being slidably mounted in an axial direction upon said drive shaft, a band friction clutch surrounding the drive shaft and interconnecting the freely mounted part of the disengageable coupling and the actuating member, means for normally constraining the two parts of the coupling in their engagement position, and means for opposing the constraining means to disengage the two parts of the coupling and thus trip the breaker.

3. A motor-operated mechanism for a circuit breaker comprising, in combination, an actuating member disposed to operate the breaker, a drive shaft, a motor for actuating the drive shaft, a friction clutch mounted between the motor and the drive shaft, a disengageable coupling having two relatively movable parts, one of said parts being freely mounted upon said drive shaft and the other part being slidably mounted in an axial direction upon said drive shaft, a band friction clutch surrounding the drive shaft and interconnecting the actuating member and the freely mounted part of the disengageable coupling, means for normally constraining the two parts of the coupling in their engagement position, and means for opposing the constraining means to disengage the two parts of the coupling and thus trip the breaker.

4. A motor-operated mechanism for a circuit breaker comprising, in combination, an actuating member disposed to operate the breaker, a drive shaft, a motor for actuating the drive shaft, a disengageable coupling having two relatively movable parts, one of said parts being freely mounted upon said drive shaft and the other part being slidably mounted in an axial direction upon said drive shaft, a band friction clutch surrounding the drive shaft and interconnecting the actuating member and the freely mounted part of the disengageable coupling, means for normally constraining the two parts of the coupling in their engagement position, means for opposing the constraining means to disengage the two parts of the coupling and thus trip the breaker, and means responsive to the speed of the motor to hold the said coupling in its disengagement position after the breaker is tripped.

5. A motor-operated mechanism for a circuit breaker comprising, in combination, an actuating breaker disposed to operate the breaker, a drive shaft, a motor for actuating the drive shaft, a disengageable coupling having two relatively movable parts, one of said parts being freely mounted upon said drive shaft and the other part being slidably mounted in an axial direction upon said drive shaft, a band friction clutch surrounding the drive shaft and interconnecting the actuating member and the freely mounted part of the disengageable coupling, means for normally constraining the two parts of the coupling in their engagement position, means for opposing the constraining means to disengage the two parts of the coupling and thus trip the breaker, a governor responsive to the speed of the motor, and means actuated by the governor to hold the said coupling in its disengagement position after the breaker is tripped.

6. A motor-operated mechanism for a circuit breaker comprising, in combination, an actuating member disposed to operate the breaker, a drive shaft, a motor for actuating the drive shaft, a disengageable coupling having two relatively movable parts, one of said parts being freely mounted upon said drive shaft and the other part being slidably mounted in an axial direction upon said drive shaft, a band friction clutch surrounding the drive shaft and interconnecting the actuating member and the freely mounted part of the disengageable coupling, means for normally constraining the two parts of the coupling in their engagement position, and latching means for securing the circuit breaker in its closed-circuit position.

7. In a motor-operated mechanism for a circuit breaker, in combination, an actuating member for actuating the breaker, a drive shaft for operating the actuating member, a disengageable coupling of the jaw type having two relatively movable parts, one of said parts having notches formed therein and being freely mounted upon the drive shaft and the other part being adapted to engage said notches and being slidably mounted in an axial direction upon the drive shaft, a band friction clutch surrounding the drive shaft and interconnecting the actuating member and the freely mounted part of the disengageable coupling, the number of said notches and the angle of motion covered by both the drive shaft and the twisting of the band friction clutch being so chosen that the number of notches times the total angle of motion equals 360°.

8. In a circuit interrupter, separable contact members for opening and closing the circuit, means including a rotatable shaft for moving said contact members to the open and to the closed position, means for actuating said shaft including a source of power and a band friction clutch, and means for releasing said clutch of the low torque end to disconnect said shaft from said source of power.

9. In a circuit interrupter, separable contact members for opening and closing the circuit, means biasing said contact members to the open circuit position, actuating means for moving said contact members to the closed circuit position against said biasing means, electro-responsive tripping means for causing said contact members to move to the open circuit position, and means operable subsequent to the operation of said tripping means for preventing said separable contacts from being immediately moved to the closed circuit condition by said actuating means.

10. In a circuit interrupter, a stationary contact member, a movable contact member for cooperating therewith to open and to close the circuit, an operating mechanism for actuating said movable contact member including a shaft and a source of power for rotating said shaft, means biasing said movable contact member to the open circuit position, means for holding said movable contact member in the closed position against said biasing means, tripping means for releasing said holding means to open the circuit, and means responsive to the speed of rotation of said shaft for preventing the reclosing of said interrupter following the opening thereof by said tripping means.

11. A circuit interrupter comprising, in combination, fixed and movable contact members for opening or closing an electrical circuit, operating means including a shaft connected to the movable contact members, power means for rotating the shaft to actuate the movable contact members to the closed position, connecting means comprising a band friction clutch interposed between the operating means and the power means, and retaining means for securing the clutch in engagement with the shaft at the low torque end, thereby permitting the application of a relatively small force for releasing the engagement of the clutch with the shaft to permit the movement of the movable contact members to the open position.

12. A circuit interrupter comprising, in combination, fixed and movable contact members for opening or closing an electrical circuit, operating means including a shaft connected to the movable contact members, power means for rotating the shaft to actuate the movable contact members to the closed position, connecting means comprising a band friction clutch interposed between the operating means and the power means, and retaining means for maintaining said clutch in engagement with said shaft at the low torque end, and means for tripping the retaining means whereby a relatively small force is required to release the movable contact members for movement to the open position.

13. In a circuit interrupter, in combination, a motor, a clutch member having a clutch surface, a band friction clutch operatively connected at its high torque end to the circuit interrupter and disposed to engage said clutch surface, and a disengageable coupling having one part connected to the low torque end of said clutch and another part disposed to be driven by said motor.

PAUL DUFFING.
WALTER HERGERT.